United States Patent [19]

Speckmann

[11] 4,149,699
[45] Apr. 17, 1979

[54] UNION BONNET VALVE

[75] Inventor: Donald R. Speckmann, Mount Prospect, Ill.

[73] Assignee: Gould Inc., Roling Meadows, Ill.

[21] Appl. No.: 794,405

[22] Filed: May 6, 1977

[51] Int. Cl.² .............................................. F16K 31/50
[52] U.S. Cl. ................................... 251/214; 251/223; 137/315
[58] Field of Search ............... 251/214, 221, 223, 224, 251/225; 137/315

[56] References Cited
U.S. PATENT DOCUMENTS

| 682,688 | 9/1901 | Hart | 251/214 |
|---|---|---|---|
| 1,114,995 | 10/1914 | Langley et al. | 251/214 |
| 1,573,108 | 2/1926 | Williston | 251/214 |
| 2,310,588 | 2/1943 | Teeters et al. | 251/214 |
| 2,319,404 | 5/1943 | Hoeh | 251/224 |
| 2,497,354 | 2/1950 | Hackathorn | 251/223 |
| 3,269,698 | 8/1966 | Koch | 251/214 |

FOREIGN PATENT DOCUMENTS

| 102415 | 8/1941 | Sweden | 251/225 |
|---|---|---|---|
| 495110 | 11/1938 | United Kingdom | 251/214 |

Primary Examiner—Martin P. Schwadron
Assistant Examiner—G. L. Walton
Attorney, Agent, or Firm—Wegner, Stellman, McCord, Wiles & Wood

[57] ABSTRACT

A union bonnet valve wherein the valve body is provided with a female threaded recess for receiving an inverted union bonnet nut securing the bonnet of the valve in the valve body. At the inner end of the threaded recess, the valve body is provided with an outwardly facing sealing shoulder and the bonnet is provided with a complementary inwardly facing shoulder secured in sealing engagement with the body shoulder by the bonnet nut. The valve further includes a stem extending outwardly through the bonnet and a sealing structure at the outer end of the bonnet for movably sealing the stem to the bonnet while yet permitting facilitated servicing of the sealing structure when desired. The metal-to-metal seal of the bonnet to the valve body shoulder provides a high pressure seal.

8 Claims, 2 Drawing Figures

UNION BONNET VALVE

BACKGROUND OF THE INVENTION

1. Field of the Invention

This invention relates to union bonnet valves and in particular to means for securing the bonnet of such valves in sealed associated with the valve body thereof.

2. Description of the Prior Art

In U.S. Pat. No. 3,084,902 of Terence G. Hare, a faucet valve with multiple seals is shown wherein a threaded collar engages a shoulder on the lower end of the sleeve to urge a beveled edge of the sleeve against a beveled surface in the faucet body. The threaded valve member is provided with a washer on its lower end held in position by a screw and adapted to have removable seating engagement with the body seat. An O-ring is provided for sealing the movable valve member to the valve body adjacent the main valve chamber.

Thomas D. Sharples et al, in U.S. Pat. No. 3,949,965, show a ball valve wherein a connecting member is pressed by a clamping screw into sealing engagement with the ball. The bushing carrying the member is provided with an outer male thread threaded to an outer housing portion of the valve.

In U.S. Pat. No. 3,966,279 of Robert D. Walker, a high pressure valve is shown wherein a gland is threaded into a female threaded bore in the valve body so that when tightened down against the packing washer thereof, a force is exerted between the washer and a lower spacer to provide a sealing force between an O-ring and the lower portion of the valve stem.

Other patents which show different forms of fluid valves but which are of less pertinency to the invention herein include those of George W. Banks U.S. Pat. No. 3,071,344; Bernard J. Gallagher et al U.S. Pat. No. 3,445,088; and Wilbur O. Teeters U.S. Pat. No. 3,851,853.

SUMMARY OF THE INVENTION

The present invention comprehends an improved union bonnet valve wherein the bonnet is secured in sealed association with the valve body by an inverted union bonnet nut having a male thread threadedly received in a female threaded recess in the valve body opening to the valving chamber. The bonnet includes a frustoconical shoulder sealingly engaging a seating shoulder in the valve body at the inner end of the threaded recess. The bonnet nut secures the bonnet in the sealed association with the valve body.

A packing seal is provided at the outer end of the bonnet for sealing the valve stem movably to the bonnet. The packing seal may be secured in sealed association with the stem by a packing nut threaded to the outer end of the bonnet. Removal of the packing nut permits facilitated removal of the packing seal for facilitated servicing of the valve without the need for complete disassembly thereof.

The seal between the bonnet and the valve body may be a metal-to-metal seal so as to provide a high pressure sealing means.

The packing may have a hardness of substantially less than that of the metal-to-metal seal between the bonnet and the valve body. In the illustrated embodiment, the packing seal is formed of a synthetic resin.

The bonnet valve of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
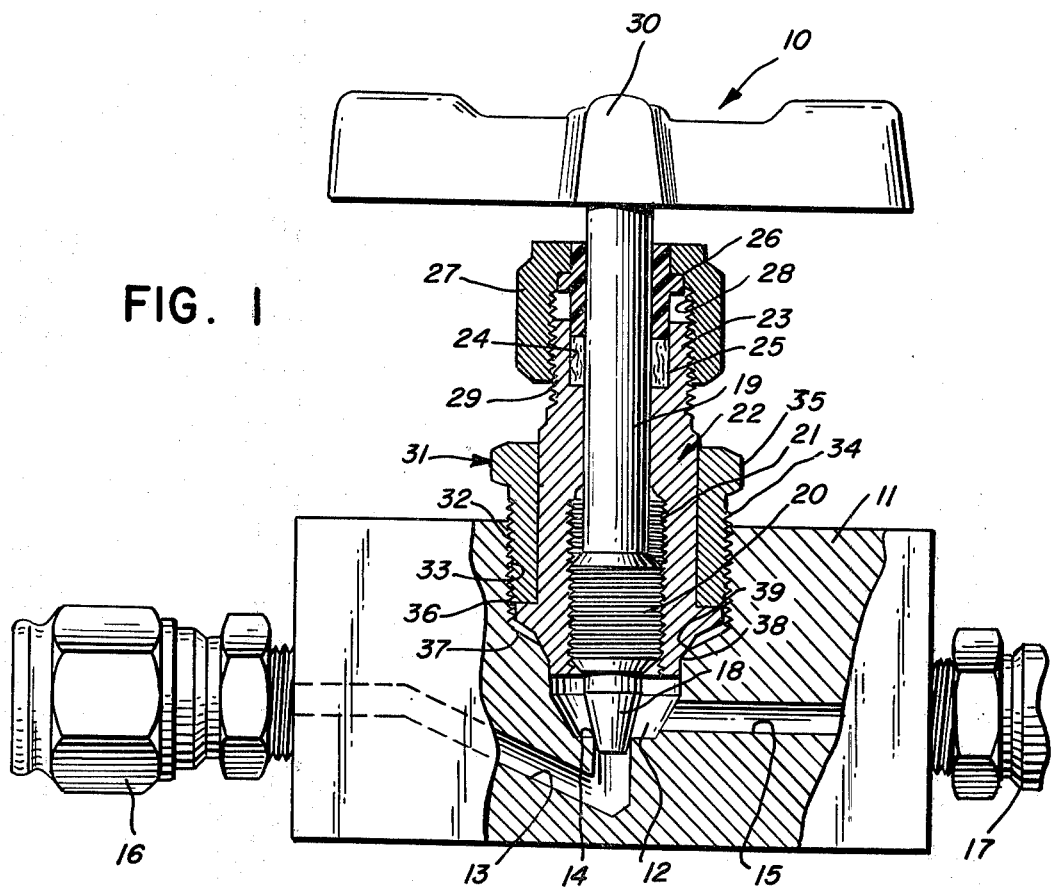
FIG. 1 is a fragmentary elevation, partly in diametric section, of a union bonnet valve embodying the invention.
Figure 2:
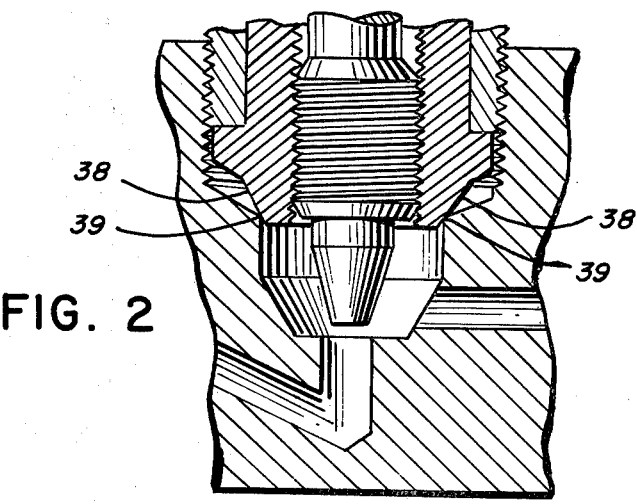
FIG. 2 is a fragmentary section illustrating in greater detail the sealing engagement of the bonnet with the valve body.

In the exemplary embodiment of the invention as disclosed in the drawing, a union bonnet valve generally designated 10 is shown to comprise a body 11 defining an internal valve chamber 12. The body is further provided with at least one inlet passage 13 opening to the valve chamber 12 at an annular seat 14, and at least one outlet passage 15 extending through the body from the valve chamber 12.

A suitable tube connector 16 may be mounted to the body in fluid communication with the inlet passage 13 and a corresponding tube connector 17 may be mounted to the body in fluid communication with the outlet passage 15.

Fluid flow from the inlet passage 13 to the outlet passage 15 is controlled by a movable valve member 18 selectively seatable on valve seat 14. Valve member 18 effectively defines a needle valve carried on a stem 19 having an inner threaded portion 20 threaded to an inwardly opening threaded recess 21 in a bonnet 22.

The outer end 23 of the bonnet defines an outwardly opening recess 24 in which is received a suitable packing ring 25. The sealing means defined by the packing ring is retained in recess 24 by a packing gland 26 and a cap nut 27 having a female threaded portion 28 threaded to a male threaded portion 29 on the bonnet outer end 23.

Stem 19 extends outwardly coaxially through the packing ring 25 and gland 26 and is provided at its distal outer end with a suitable handle 30 for effectively rotating the stem about the longitudinal axis thereof and thereby threading the stem inwardly and outwardly in the threaded recess 21 of the bonnet so as to selectively seat the valve portion 18 on the valve seat 14 or space it from the valve seat 14 as desired.

The invention comprehends an improved means for securing the bonnet sealingly to the valve body 11 and in the illustrated embodiment, includes a union member in the form of a nut 31 having a male threaded portion 32 threaded to a female threaded portion 33 of a recess generally designated 34 in body 11 opening inwardly to the valve chamber 12. The union nut further defines an outer annular array of flatted surfaces 35 adapted for engagement by a suitable tool, such as a wrench, in installing and removing the nut relative to the threaded body recess.

Bonnet 22 further defines an outwardly facing annular shoulder 36 which is engaged by an inwardly facing annular shoulder at the inner end of nut 31. Bonnet 22 further defines, at its inner end, a frustoconical inwardly facing shoulder 38 abutting an annular sealing corner portion 39 of the body at the inner end of the recess 37 in the installed arrangement of the valve as shown in FIG. 1. As shown, corner sealing portion 39 may define an obtuse corner angle.

More specifically, shoulder 38 and corner portion 39 define a positive metal-to-metal seal between the bonnet 22 and body 11 providing high pressure sealing of the bonnet to the body in the assembled arrangement of the valve. A preselected high seating pressure between surface 38 and corner portion 39 is provided by suitable tightening of the bonnet nut 31 against the bonnet shoulder 36, as shown in FIG. 1.

Thus, the present invention comprehends an improved union bonnet valve structure precluding inadvertent unthreading of the nut by continued outward threading of the valve stem after the threaded portion 20 reaches the outer end of the threaded recess 21. Further, the nut provides positive means for effecting a positive metal-to-metal seal of the bonnet to the valve body to provide improved high pressure sealing of the valve.

The provision of the stem sealing means at the outer end of the bonnet for facilitated servicing thereof without the need for removing other portions of the valve provides further facilitated maintenance. Thus, there is no need to take the valve off line to replace or service the packing. Handle 30 is removably installed to the outer end of the stem and, thus, may be removed permitting the cap nut 27, the packing gland 26, and the sealing ring 25 to be similarly removed while maintaining the valve member 18 in seated engagement with the valve seat 14.

The readily removable metal-to-metal seal of shoulder 38 to corner portion 39 in combination with the improved outer packing seal provides an improved high pressure valve having the improved safety features discussed above while yet being of extremely simple and economical construction and servicing.

The foregoing disclosure of specific embodiments is illustrative of the broad inventive concepts comprehended by the invention.

I claim:

1. In a union bonnet valve having a metal body having an outwardly opening recess defining at its inner end a valve chamber, a female threaded outer portion, an annular sealing corner portion between said valve chamber and said outer portion, a first passage opening through an annular valve seat to said valve chamber and defining therewith a valve seat, a second passage opening to said valve chamber in spaced relationship to said valve seat, a metal bonnet extending into said recess, a valve stem longitudinally movably carried by said bonnet and defining an inner movable valve portion selectively seatable on said valve seat for controlling fluid flow between said passages, and a stem-to-bonnet seal accessible from outwardly of said bonnet for movably sealing the stem to said bonnet outwardly of said valve chamber, said seal being removable from the valve with the movable valve portion of the stem seated on said valve seat to permit in-service replacement of the seal when desired, the improvement comprising:

an inwardly facing frustoconical surface on said metal bonnet abutting said sealing corner portion and an outwardly facing shoulder outwardly thereof; and a union member having a through bore coaxially mounting said bonnet and having an outer male thread removably secured to said body female threaded portion, and an inwardly facing shoulder engaging said bonnet outwardly facing shoulder to urge said bonnet inwardly facing frustoconical surface nonrotatively sealingly against said body sealing corner portion thereby providing a high pressure metal-to-metal line contact seal comprising the sole means for sealingly securing the bonnet to the body, said bonnet frustoconical surface extending inwardly beyond the sealing corner in the made-up condition of the valve.

2. The union bonnet valve of claim 1 wherein said valve seat comprises a right angular outer edge of said first passage.

3. The union bonnet valve of claim 1 wherein said valve seat comprises a right angular outer edge of said first passage and said stem movable valve portion defines a frustoconical seating surface extending partially into said first passage in the closed arrangement of the valve.

4. The union bonnet valve of claim 1 wherein said valve seat and movable valve portion define a high pressure metal-to-metal sealing means and said stem-to-bonnet seal comprises a resilient sealing means having a hardness substantially less than that of said metal-to-metal sealing means.

5. The union bonnet valve of claim 1 wherein said valve seat comprises a right angular outer edge of said first passage and said stem movable valve portion defines a frustoconical seating surface extending partially into said first passage in the closed arrangement of the valve, said seating surface extending at an angle of approximately 15° to the longitudinal axis of the stem.

6. In a union bonnet valve having a metal body having an outwardly opening recess defining at its inner end a valve chamber, a female threaded outer portion, an annular sealing corner portion between said valve chamber and said outer portion, a first passage opening through an annular valve seat to said valve chamber and defining therewith a valve seat, a second passage opening to said valve chamber in spaced relationship to said valve seat, a metal bonnet extending into said recess, and a valve stem longitudinally movably carried by said bonnet and defining an inner movable valve portion selectively seatable on said valve seat for controlling fluid flow between said passages, the improvement comprising:

an inwardly facing frustoconical surface on said metal bonnet abutting said sealing corner portion, a cylindrical portion projecting inwardly from said frustoconical surface to within said chamber, and an annular flange defining an outwardly facing shoulder outwardly of said frustoconical surface; and a union member having a through bore coaxially mounting said bonnet and having an outer male thread removably secured to said body female threaded portion, and an inwardly facing shoulder engaging said bonnet outwardly facing shoulder to urge said bonnet inwardly facing surface nonrotatively sealingly against said body seating portion thereby sealingly securing the bonnet to the body, said bonnet frustoconical surface extending inwardly beyond the sealing corner in the made-up condition of the valve.

7. The union bonnet valve of claim 6 wherein said bonnet inwardly facing surface is frustoconical.

8. In a union bonnet valve having a metal body having an outwardly opening recess defining at its inner end a valve chamber, a female threaded outer portion, an annular sealing corner portion between said valve chamber and said outer portion, a first passage opening through an annular valve seat to said valve chamber and defining therewith a valve seat, a second passage opening to said valve chamber in spaced relationship to said valve seat, a metal bonnet extending into said recess, and a valve stem longitudinally movably carried by said bonnet and defining an inner movable valve portion selectively seatable on said valve seat for controlling fluid flow between said passages, the improvement comprising:

an inwardly facing frustoconical surface on said metal bonnet abutting said sealing corner portion, a cylindrical portion projecting inwardly from said frustoconical surface to within said chamber, and an annular flange defining an outwardly facing shoulder outwardly of said frustoconical surface; and a union member having a through bore coaxially mounting said bonnet and having an outer male thread removably secured to said body female threaded portion, and an inwardly facing shoulder engaging said bonnet outwardly facing shoulder to urge said bonnet inwardly facing surface nonrotatively sealingly against said body seating portion thereby sealingly securing the bonnet to the body, said sealing corner portion defining an obtuse angle, said bonnet frustoconical surface extending inwardly beyond the sealing corner in the made-up condition of the valve.

* * * * *